US007550952B2

(12) United States Patent
Kurokami et al.

(10) Patent No.: US 7,550,952 B2
(45) Date of Patent: Jun. 23, 2009

(54) ELECTRIC POWER CONTROL APPARATUS, POWER GENERATION SYSTEM AND POWER GRID SYSTEM

(75) Inventors: Seiji Kurokami, Shiga-ken (JP); Nobuyoshi Takehara, Shiga-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/290,138

(22) Filed: Oct. 29, 2008

(65) Prior Publication Data

US 2009/0069950 A1    Mar. 12, 2009

Related U.S. Application Data

(62) Division of application No. 11/099,580, filed on Apr. 6, 2005, now Pat. No. 7,456,604.

(30) Foreign Application Priority Data

Apr. 19, 2004   (JP)   ............... 2004-123442

(51) Int. Cl.
 *H02P 9/00* (2006.01)
 *H02H 7/122* (2006.01)
(52) U.S. Cl. .................. 322/45; 363/56.03
(58) Field of Classification Search ............ 322/45; 363/56.03
 See application file for complete search history.

(56) References Cited

U.S. PATENT DOCUMENTS

| 5,621,300 | A | * | 4/1997 | Sato et al. ............ 320/101 |
|---|---|---|---|---|
| 5,670,833 | A | * | 9/1997 | Mengelt et al. ........ 307/66 |
| 5,714,869 | A | | 2/1998 | Tamechika et al. ...... 320/101 |
| 5,745,368 | A | * | 4/1998 | Ejebe et al. ........... 702/164 |
| 5,751,133 | A | | 5/1998 | Sato et al. ............ 320/101 |
| 5,869,956 | A | * | 2/1999 | Nagao et al. .......... 323/299 |
| 5,892,354 | A | * | 4/1999 | Nagao et al. .......... 323/299 |
| 5,923,158 | A | * | 7/1999 | Kurokami et al. ...... 323/299 |
| 5,986,354 | A | | 11/1999 | Nagao et al. .......... 307/64 |

(Continued)

FOREIGN PATENT DOCUMENTS

JP    63-186538    8/1988

(Continued)

*Primary Examiner*—Nicholas Ponomarenko
*Assistant Examiner*—Pedro J Cuevas
(74) *Attorney, Agent, or Firm*—Fitzpatrick, Cella, Harper & Scinto

(57) ABSTRACT

An electric power control apparatus outputs output from a power generation apparatus to a power system has a power converter that converts power output from the power generation apparatus and a power storage apparatus that stores output from the power generation apparatus or output from the power converter as well as discharges stored electric power as necessary detects an amount of electric power generated at the power generation apparatus within a predetermined time period, sets an output pattern of the electric power control apparatus in a next predetermined time period based on the amount of electric power of each predetermined time period, and controls the output of the electric power control apparatus in accordance with the output pattern. By so doing, for example, even where the output from the power generation apparatus fluctuates, the amount of electric power output to the power system is decided in advance, and electric power equivalent to the difference between the predetermined amount and the output amount is stored in a power storage apparatus or discharged from the power storage apparatus.

4 Claims, 10 Drawing Sheets

U.S. PATENT DOCUMENTS

| | | | | |
|---|---|---|---|---|
| 6,067,458 A * | 5/2000 | Chen | ............................ | 455/522 |
| 6,101,073 A * | 8/2000 | Takehara | ...................... | 361/42 |
| 6,320,769 B2 * | 11/2001 | Kurokami et al. | ......... | 363/56.03 |
| 6,330,462 B1 * | 12/2001 | Chen | ............................ | 455/572 |
| 6,493,246 B2 * | 12/2002 | Suzui et al. | .................... | 363/95 |
| 6,590,793 B1 | 7/2003 | Nagao et al. | .................... | 363/95 |
| 6,605,881 B2 * | 8/2003 | Takehara et al. | ............... | 307/86 |
| 6,611,441 B2 | 8/2003 | Kurokami et al. | ......... | 363/56.02 |
| 6,761,581 B2 | 7/2004 | Takehara et al. | ............. | 439/502 |
| 6,963,147 B2 | 11/2005 | Kurokami et al. | ............ | 307/154 |
| 7,177,168 B2 * | 2/2007 | Toyomura et al. | ............ | 363/131 |
| 7,251,741 B2 * | 7/2007 | Kobayashi et al. | ............ | 713/502 |
| 7,277,779 B2 * | 10/2007 | Zima et al. | ................... | 700/292 |
| 7,352,798 B2 * | 4/2008 | Oura et al. | ................... | 375/147 |
| 7,430,675 B2 * | 9/2008 | Lee | ............................ | 713/320 |
| 7,456,604 B2 * | 11/2008 | Kurokami et al. | ............ | 320/101 |
| 2001/0048605 A1 | 12/2001 | Kurokami et al. | ......... | 363/56.03 |
| 2003/0111990 A1 * | 6/2003 | Miyauchi et al. | ............. | 323/288 |
| 2005/0234599 A1 * | 10/2005 | Kurokami et al. | ............ | 700/286 |
| 2005/0249304 A1 * | 11/2005 | Takano et al. | ................ | 375/267 |
| 2005/0254607 A1 * | 11/2005 | Oura et al. | .................... | 375/346 |
| 2007/0273342 A1 * | 11/2007 | Kataoka et al. | .............. | 323/234 |
| 2008/0201587 A1 * | 8/2008 | Lee | ............................ | 713/320 |

FOREIGN PATENT DOCUMENTS

| | | | |
|---|---|---|---|
| JP | 63186538 A | * | 8/1988 |
| JP | 02061227 A | * | 3/1990 |
| JP | 2-61227 | | 12/1990 |

* cited by examiner

OUTPUT

TIME

INPUT TARGET VALUE

TIME

OUTPUT PATTERN

TIME

OUTPUT

TIME

INPUT TARGET VALUE

TIME

OUTPUT PATTERN

TIME

ELECTRIC POWER CONTROL APPARATUS, POWER GENERATION SYSTEM AND POWER GRID SYSTEM

This application is a divisional of U.S. patent application Ser. No. 11/099,580, filed Apr. 6, 2005, the contents of which are incorporated by reference herein.

FIELD OF THE INVENTION

This invention relates to an electric power control apparatus, a power generation system and a power grid system, and more particularly, to control of an electric power control apparatus that converts power the output from a power generation apparatus for output to a power system.

BACKGROUND OF THE INVENTION

In recent years, environmental problems such as global warming due to release of carbon dioxide gas accompanying use of fossil fuels, radioactive contamination caused by accidents in atomic power plants and nuclear waste are serious, and the spotlight centers on terrestrial environment and energy. In this situation, a solar cell utilizing sunlight as an inexhaustible and clean energy source and the like is in practical use throughout the world.

In a solar battery, the output electric power fluctuates widely depending on the intensity of the sunlight striking the photosensitive surface of the cell. Consequently, when tying a power generation means having such sharp output fluctuation to a power system (hereinafter also called simply a "system"), in order to stabilize the frequency and voltage of the system it is necessary to stabilize the output using a power storage apparatus.

Through this output stabilization, the degradation of the quality of the frequency and voltage of the system due to the following two factors is redressed. One factor is rapid output fluctuation on the power generation side, and the other factor is fluctuation in the load connected to the system.

Numerous control methods and systems for this type of output stabilization have been proposed. For example, Patent Publication No. 2-61227 describes, when tying a solar battery to a system, temporarily storing the output of the solar battery in a battery or the like so that the sharp fluctuations in the output of the solar battery do not affect the system, detecting the solar battery output or sunlight, and controlling the output of a grid tied inverter so that this becomes a smooth value.

In addition, Japanese Laid-Open Patent Publication No. 63-186538 describes a method of attaching a system stabilization apparatus consisting of a battery and a two-way converter to the power system and, when a load fluctuation occurs, adjusting the system stabilization apparatus output.

In other words, where system output fluctuations occurring when tying a solar power generation system affect the load, this method supplies power from the system stabilizing apparatus when the power is insufficient and carries out load leveling that stores power in the power storage apparatus when the power is excessive.

By contrast, ordinarily, a plurality of power generators (hereinafter called "system power-generating means") are connected to the power system side. The operation (that is, the starting and stopping) of these power generators is decided by a supply and demand plan determined in advance. The supply and demand plan is usually drawn up taking past demand fluctuations into account, and the power generators are started and stopped in accordance with the plan.

However, when connecting (that is, tying to a grid) an unstable power generating means such as a solar battery to a system in which the system power generating means are controlled according to a supply and demand plan based simply on actual past loads as described above, because the electric power generated by an unstable power generating means such as a solar battery cannot be relied upon, that electric power must be estimated as much lower than at ordinary operating times. As a result, when a power generating means with the unstable output of a solar battery or the like is connected, in terms of the operation of the power generators, the amount of waste is very great.

In order to eliminate this waste, the output of a power generating means with the unstable output of a solar battery or the like could be stabilized using a power storage apparatus like that described in Japanese Laid-Open Patent Publication No. 63-186538 described above.

However, the method described in Japanese Laid-Open Patent Publication No. 63-186538 assumes that the power generators provided on the system basically all generate power in accordance with a fixed supply and demand plan.

Consequently, for example, in a case in which the output of the solar battery and the like is greatly affected over a wide area by a hurricane or other sudden localized weather disturbance, for safety's sake the capacity of the power storage apparatus must be made sufficiently large, thus raising the cost of a power generation system equipped with an unstable power generating means such as a solar battery or the like.

SUMMARY OF THE INVENTION

Accordingly, the present invention is conceived in light of the foregoing, and has as an object to reduce the capacity of a power storage apparatus of an electric power control apparatus that includes a power converter and a power storage apparatus and that converts the output from power generating means and outputs the converted output to a power system.

The above-described object of the present invention is achieved by an electric power control apparatus that converts power output from a power generation apparatus for outputs to a power system, the apparatus comprising: a power converter that converts power output from the power generation apparatus; a power storage apparatus that stores output from the power generation apparatus or output from the power converter as well as discharges stored electric power as necessary; a detection unit that detects an amount of electric power generated at the power generation apparatus within a predetermined time period; and a control unit that sets an output pattern of the electric power control apparatus in a next predetermined time period based on the amount of electric power of each predetermined time period, and controlling the output of the electric power control apparatus in accordance with the output pattern.

In other words, with the present invention, an electric power control apparatus, which includes a power converter that converts power output from the power generation apparatus and a power storage apparatus that stores output from the power generation apparatus or output from the power converter as well as discharges stored electric power as necessary, detects an amount of electric power generated at the power generation apparatus within a predetermined time period, sets an output pattern of the electric power control apparatus in a next predetermined time period based on the amount of electric power of each predetermined time period, and controls the output of the electric power control apparatus in accordance with the output pattern.

According to such a configuration, the output from the electric power control apparatus in a next predetermined time period is controlled by the amount of power generated within each predetermined time period, and thus, for example, even where the output from the power generators fluctuates, the amount of electric power output to the power system is determined in advance, and electric power equivalent to the difference between that and the amount of electric power is absorbed by charging to the power storage apparatus or discharging from the power storage apparatus.

Therefore, in addition to being able to reduce the capacity of the power storage apparatus inside the electric power control apparatus, on the power system side the supply and demand plan can be formulated well in advance.

The control unit may set the output pattern so that the amount of electric power output from the electric power control apparatus within a next predetermined time period and the amount of electric power output from the electric power control apparatus within the predetermined time period are substantially equivalent.

In this case, the output pattern may be such that the amount of electric power from the electric power control in the next predetermined time period is substantially the same.

Alternatively, the output pattern may have a changeover portion that changes a value of electric power output from the electric power control apparatus in a portion of the next predetermined time period.

In this case, a speed of a change in output from the electric power control apparatus in the changeover portion may be limited to or below a predetermined value.

The input/output of the power storage apparatus may be connected to the input side of the power converter, and the control unit may control the output electric power from the power converter.

The electric power control apparatus may further comprise a accumulation condition detection unit that detects a accumulation condition of a power storage apparatus, and the control unit may correct the output pattern according to the detected accumulation condition.

In addition, the above-described object is also achieved by an electric power generation system and a power grid system using the electric power control apparatus according to the present invention.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will now be described in detail in accordance with the accompanying drawings. Note that each element in the following embodiment is not intended to limit the scope of the invention, but is described only as an example.

(Basic Structure)

Figure 1:
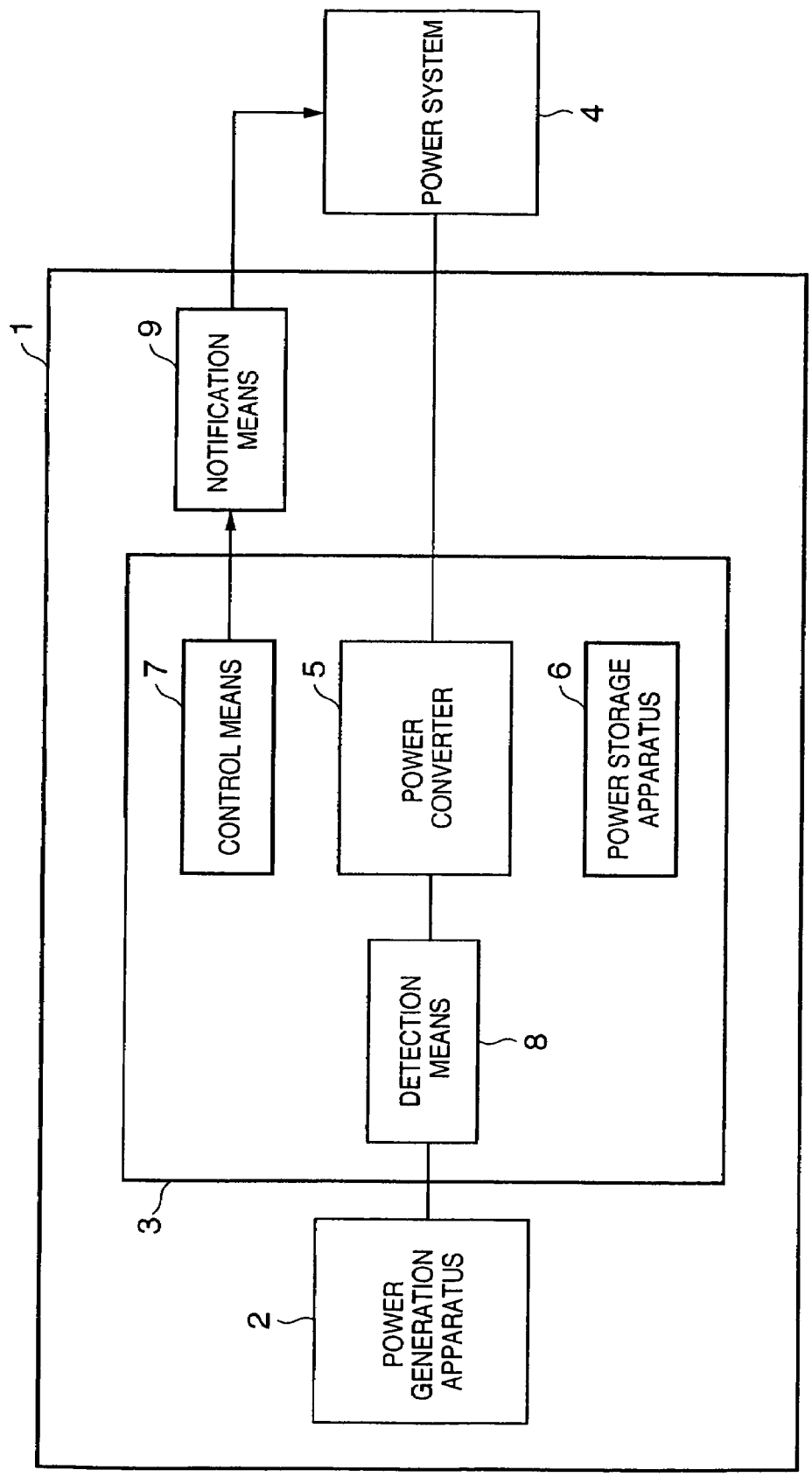
FIG. 1 is a block diagram showing a basic configuration of a power generation system according to the present invention.

FIG. 1 is a block diagram showing a basic configuration of a power generation system according to the present invention.

A power generation system 1 is comprised of a power generation apparatus 2 and an electric power control apparatus 3 that inputs electric power output from the power generation apparatus 2 and outputs the electric power to a power system 4. The electric power control apparatus 3 is comprised of a power converter 5, a power storage apparatus 6, a control means 7 and a detection means 8, with output from the control means 7 output to a notification means 9 and the output of the notification means 9 input to the power system A.

Figure 9:
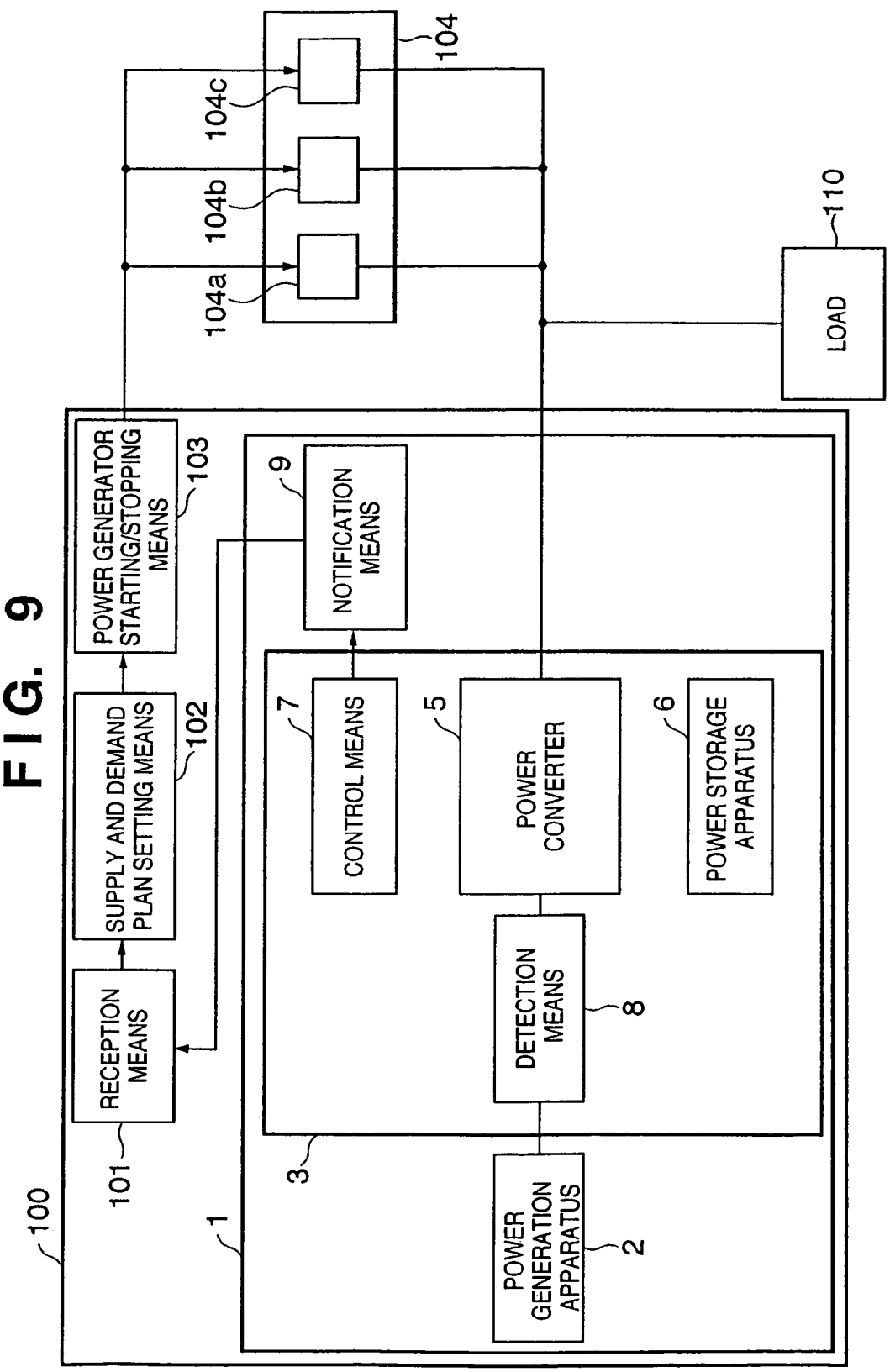
FIG. 9 is a block diagram a basic configuration of a power grid system according to the present invention.

Furthermore, FIG. 9 is a block diagram showing a basic configuration of a power grid system 100 according to the present embodiment, showing the configuration of the power system 4 shown in FIG. 1 in greater detail. The power system 4 is comprised of a power generator including three power generators 104a, 104b and 104c, a receiving means that receives signals from a notification means 9 of the power generation system 1, a supply and demand plan setting means for setting a supply and demand plan for the power generators 104 by signals from the receiving means 101, and a power generator starting/stopping means 103 for starting and stopping the power generators based on the supply and demand plan, with the output from the power generators 104 supplied to a load 110.

The electric power control apparatus 3 is comprised of a power converter 5 that converts and outputs the electric power generated by the power generation apparatus 2, a power storage apparatus 6 that stores the output from the power generation apparatus 2 or the output from the power converter 5 and discharges as necessary, detection means 8 that detects the amount of power generated by the power generation apparatus 2, and control means 7 that inputs the generated power amount detected by the detection means 8, confirms in advance an output pattern output from the electric power control apparatus 3 at a next predetermined time period, and issues an instruction to output from the electric power control apparatus 3 based on the output pattern. In addition, the power generation system 1 is also comprised of a notification means 9 that provides power generation schedule information to the power system 4 (the supply and demand plan setting means) based on the output pattern.

Provided that it has a variable output, the power generation apparatus 2 is not particularly limited to any specific embodiment. Thus, for example, a solar battery, a wind-powered generator, a thermoelectric generator, or a combination of these devices may be used as the power generation apparatus 2. Where a device such as a solar battery or a wind-powered generator, which uses renewable energy and whose output is unstable and variable and therefore difficult to predict, is used as the power generation apparatus 2, the effect obtained by the present invention is particularly outstanding and optimal. In addition, the system may be configured in such a way that the generated power output from the solar battery or the like may be converted by a converter and output.

Figure 2:
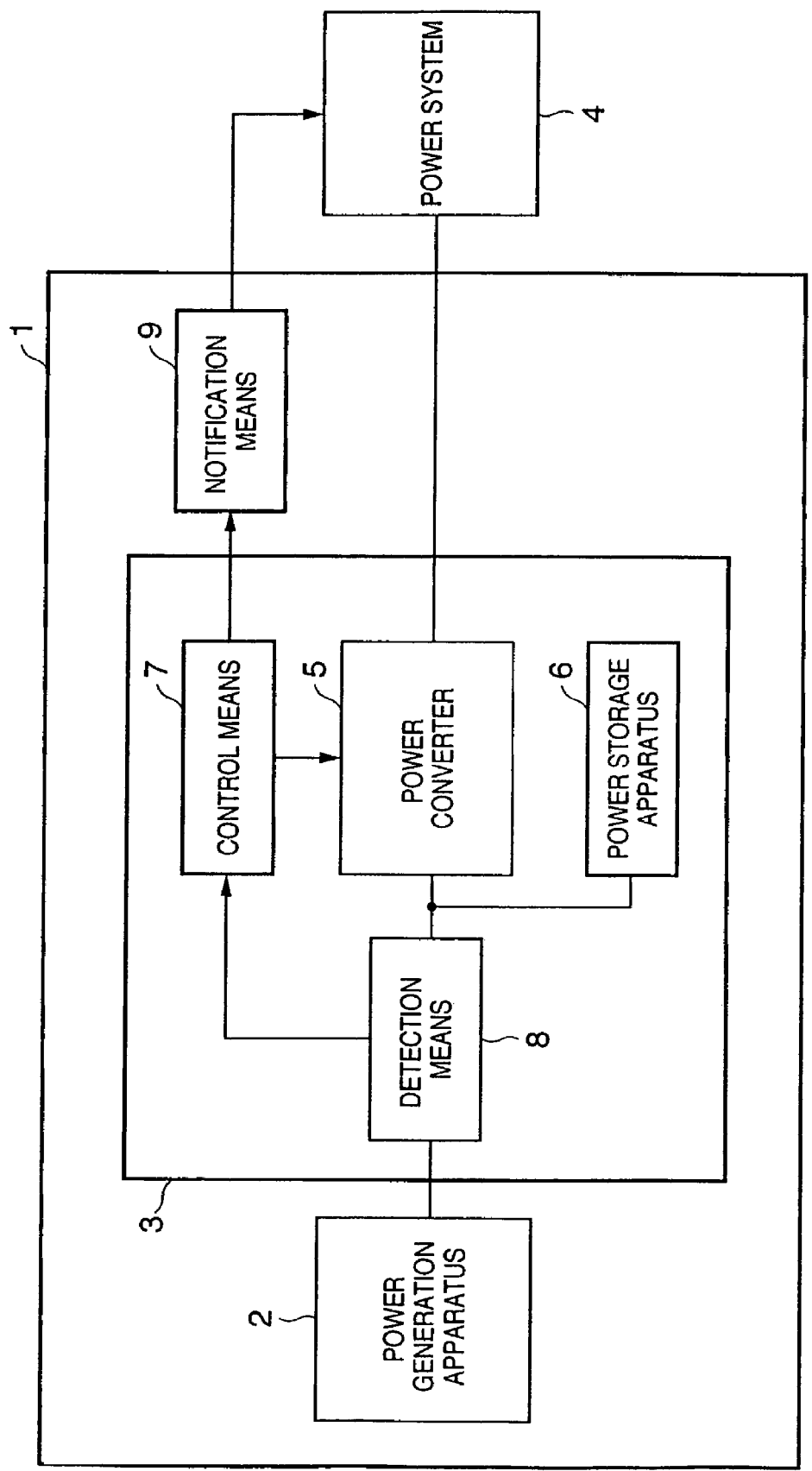
FIG. 2 is a block diagram showing a basic configuration of an electric power control apparatus of the power generation system shown in FIG. 1.

FIG. 2 is a block diagram showing a more specific configuration of the electric power control apparatus 3. With the configuration shown in the diagram, the input/output section of the power storage apparatus 6 is connected between the detection means 8 and the power converter 5. The output from the power generation apparatus 2 and/or the power storage apparatus 6 is input to the power converter 5. Instructions from the control means 7 are input to the power converter 5 and the power converter 5 converts power to obtain an output based on the instructions for output to the power system 4.

Figure 3:
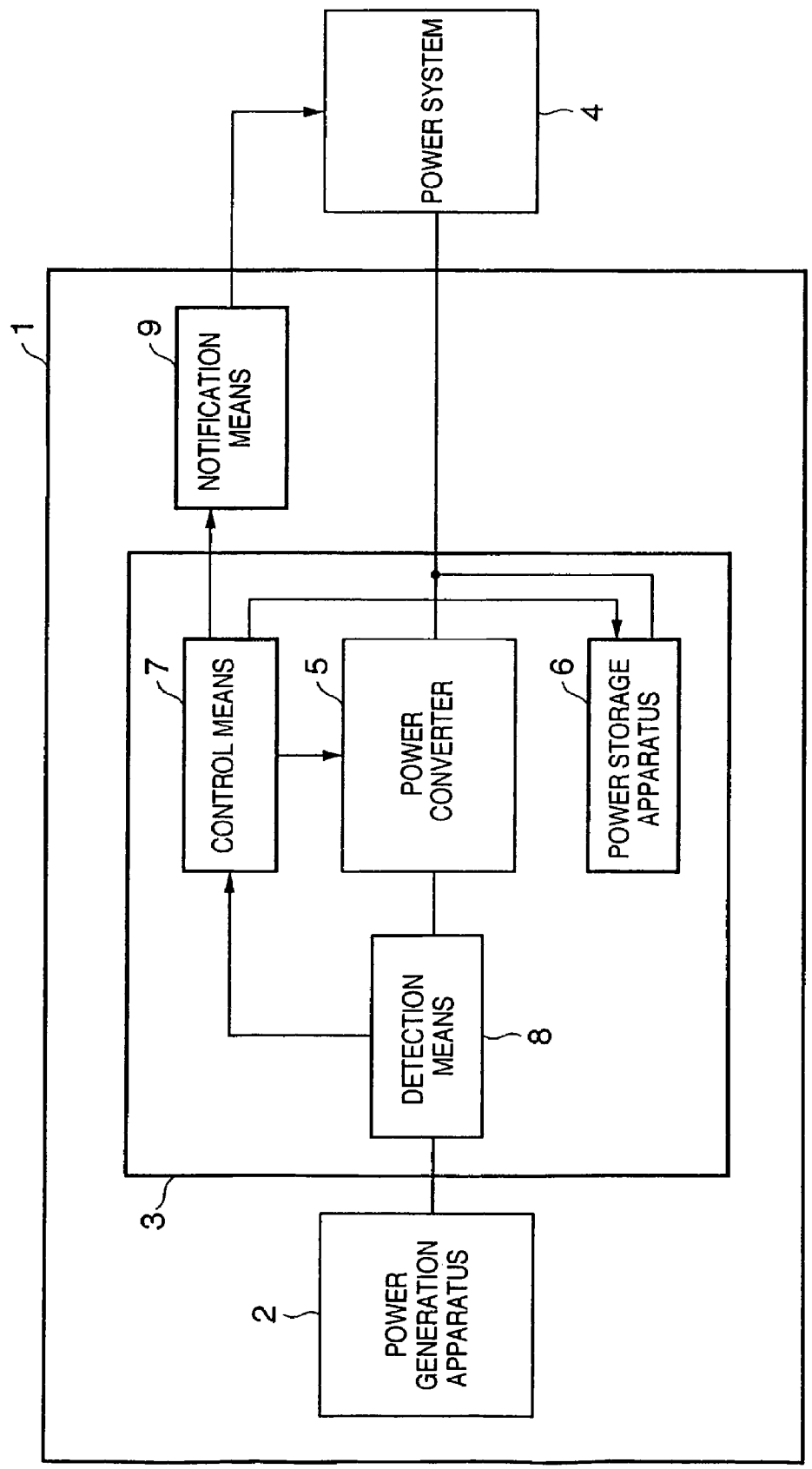
FIG. 3 is a block, diagram showing, a basic configuration of an electric power control apparatus of the power generation system shown in FIG. 1.

FIG. 3 is a block diagram showing another specific configuration of the electric power control apparatus of the present invention. With the configuration shown in the diagram, the input/output section of the power storage apparatus 6 is connected to the output side of the power converter 5, and the output from the power generation apparatus 2 is input to the power converter 5. Instructions from the control means 7 are input to the power converter 5, and the power converter 5 adjusts the charge and discharge of the power storage apparatus 6 in order to obtain an output based on the instructions for output to the power system 4.

As the power system 4, a three-phase three-wire system, a single-phase two-wire system or a single-phase three-wire system, of either alternating current or direct current, may be used. In particular, where the capacity of the power generator 104 in the system is relatively small (several tens of MW or less), or the amount of electric power of the power generation apparatus 2 of the power generation system 1 is more than 5 percent of the total amount of generated power of the power generators in the system, the power system 4 is susceptible to the effects of fluctuations in the output of the power generation system 1, and therefore a method that determines the output pattern like that of the present invention and is designed to stabilize the system is applied.

In particular, the present invention, which is designed to set an output pattern and stabilize output, is especially suitable to a stand alone power system that operates mainly diesel power generators as the power generator 4, because the relatively small power generation capacity of such a system makes the diesel power generator operation (that is, the starting/stopping of the generator) vulnerable to the effects of fluctuations in the output of the power generation system 1.

The power converter 5 may be any circuit configuration capable of providing output of the electrical system adapted to the power system 4, and is not limited to any particular system or configuration. For example, if the power system 4 is a three-phase three-wire system, then a three-phase bridge circuit or a modification thereof can be used for the three-phase output pattern. In addition, a configuration can also be used in which a DC/DC converter is provided at a stage prior to a three-phase output inverter and voltage from the power generation apparatus 2 is stepped up to a desired voltage and provided to a three-phase output inverter.

The power storage apparatus 6 is not particularly limited to any specific embodiment, provided that it can respond to the output fluctuations of the power generation apparatus 2. For example, any power storage device capable of storing and discharging energy, such as a secondary battery such as a lithium-ion secondary battery, a nickel-metal hydride secondary battery, a NAS battery or the like, a condenser such as an electric double layer capacitor or the like, or a flywheel power storage apparatus, can be used. In addition, power conversion circuits for charging and/or discharging may be provided as well.

Where such power conversion circuits are provided on the power storage apparatus 6, it is also possible to dispose the power storage apparatus 6 between the power converter 5 of the power generation system 1 and the power system 4 as shown in FIG. 3. The power conversion circuit for charging and the power conversion circuit for discharging may be combined, thereby making the system compact and lightweight as well as achieving cost reduction. In addition, a plurality of power storage apparatuses 6 may be provided, in which case the power storage apparatuses may be the same type of power storage device or different types of power storage devices. For example, using a combination of a power storage apparatus comprised of compact/small-capacity lead-acid batteries or lithium-ion batteries, on the one hand, and a power storage apparatus comprised of long-lasting/high-speed charge/discharge-capable electric double layer condenser or flywheel power storage apparatus on the other, enables each type of device to supplement the shortcomings of the other type, and is preferable.

The control means 7 may be configured as appropriate using a DSP or a CPU comprised of a RAM. A ROM, an I/O interface and the like, an analog processing circuit, a digital processing circuit and so forth. The output pattern is such that, when set so as to output in a next predetermined time period a predetermined output value that is a cumulative generated power amount detected by the detection means 8 averaged over a predetermined time period, a fixed value is output to the power system 4 from the power generation system in the next predetermined time period. The power generators on the power system 4 side can then know, either when the predetermined time period ends or shortly before the predetermined time period ends, that the aforementioned fixed amount of electric power will be output to the power system 4 in the next predetermined time period.

Accordingly, by taking this fixed amount of electric power into consideration in the creation of a supply and demand plan and operating (that is, starting and stopping) the power generators 104 on the power system 4 in accordance with that supply and demand plan, it is no longer necessary to provide a large-capacity power storage apparatus in order to have a margin of error that takes into account fluctuations in power output of the power generation system 1 (since the large capacity entails the possibility of very large amounts of wasted electric power), and therefore it is possible to greatly reduce the operating costs of the power generators 104. In addition, the output pattern may be set so that the speed of the fluctuation in output from the power converter 5 (the degree and slope of the fluctuation) is at or below a predetermined value when shifting from one predetermined output value to the next predetermined output value. In that case, the effect on the power system 4 of fluctuation in output from the power generating means that occurs when shifting to the next predetermined time period can be minimized, which is preferable.

In addition, the output pattern may be set taking into consideration the power converter 5 conversion efficiency (conversion loss), in which case the electric power to be stored in the power storage apparatus 6 can be controlled more accurately. As a result, the capacity of the power storage apparatus 6 can be reduced, the apparatus made more compact and its cost reduced also, and the management and control of the storage level made easy, which is preferable.

There is no particular limitation on the duration of the predetermined time period. However, if the predetermined time period is shortened the capacity of the power storage apparatus 6 can be reduced, and therefore it is preferable to reduce the predetermined time period within a range through which the operation (starting/stopping) of the power generators 104 of the power system 4 can be tracked. For example, if the power generator 104 is an internal combustion-power generator such as a diesel power generator, then the starting time is from several tens of seconds to about five minutes, and it is necessary to make the predetermined time period longer than this starting time. However, the life of the power generator decreases if the frequency (the number of times) that the power generators of the power system 4 are started and stopped is too high, and therefore the predetermined time period should be set in a range of from 10 minutes to 2 hours.

The detection means 8 is not limited to any particular configuration, provided that it can detect the amount of power generated by the power generation apparatus 2 in the predetermined time period. For example, the detection means 8 may detect the output current and the output voltage of the power generation apparatus 2, obtain the output electric power of the power generation apparatus 2 by multiplying the detected current by the detected voltage, and detect the amount of power generated by the power generation apparatus 2 by integrating (cumulatively) the detected power over the predetermined time period. In addition, if the output voltage of the power generation apparatus 2 is generally fixed, then the detection means 8 may detect only the power generation apparatus 2 output current, obtain a value equivalent to the amount of power generated by integrating the detected current over the predetermined time period, and use this as the detected amount of power generated. In addition, the configuration to multiply the detected current by the detected voltage or the configuration to integrate the detected electric power over the predetermined time period may be combined with a portion of the control means 7 described above, which has the advantage of enabling the apparatus to be made compact and the cost of the system to be reduced.

The notification means 9, at least when the predetermined time period ends or just before the predetermined time period ends (that is, before the communication time+the time necessary for the power system 4 power generating means starting time), provides information concerning a scheduled output of the power generation system based on the output pattern to a supply and demand plan setting means 102 that sets the supply and demand plan for the power generators of the power system 4. As the communication means a wire communications or wireless communications arrangement, for example, telephone line communications, internet/intranet communications, private line communications, satellite communications or a combination of these may be used as appropriate. If the notification means 9 is comprised of a plurality of communications means of the same type or of different types, then the reliability of the power generation system 1 and the power system 4 is improved, which is preferable.

In addition, in the case of the configuration shown in FIG. 2, it is not necessary that the instruction values from the control means 7 to the power converter 5 are values indicative of the output electric power of the power converter 5. The instructions value may be a value indicative of the input electric power input to the power converter 5, calculated taking the loss of power due to the conversion efficiency of the power converter 5, in which case the power converter 5 is controlled by the input electric power value, and therefore means for detecting the input electric power are provided on the power converter 5. Such an arrangement has the advantage of simplifying management of the accumulation condition of the power storage apparatus 6.

In a system comprised of a plurality of power generation systems 1 connected to the power system 4, if each of the power generation systems is set and controlled so that the timing of the predetermined time period is different for each power generation system, then each power generation system 1 adjusts output at different times, which can drastically reduce the effect on the power system of output fluctuations of the power generation systems, which is preferable. In addition, in this case, from the viewpoint of the power generators of the power system, the effect is the same as shortening the predetermined time period. In addition to the fact that the output schedule information is updated in brief time intervals, because the electric power output from other power generation systems besides the power generation system that updates the output schedule information next does not change, it is possible to create a more detailed operating plan for the power generators of the power system, which is preferable.

The power storage apparatus 6 may be provided with accumulation condition detection means for detecting an accumulation condition and the pattern may be corrected according to the detected accumulation condition. In this case, control and restriction of an amount of increase in the accumulation condition and control of the lower limit of the accumulation condition are possible, and therefore the reliability of the power storage apparatus 6 can be improved. In addition, the capacity of the power storage apparatus 6 can be reduced, and therefore the power storage apparatus 6 can be made more compact and its cost can be reduced. As an accumulation condition detection means of this type there is, for example, that which detects a charge/discharge current, integrates its value and detects a charge/discharge current amount. In addition, where an electric double layer capacitor is used in the power storage apparatus 6, it is also possible to use the voltage of the electric double layer capacitor.

In addition, the output pattern should be corrected taking into account the charge/discharge efficiency of the power storage device(s) used by the power storage apparatus 6 or the conversion efficiency of the power conversion circuit of an electric power storage apparatus 6 comprised of an electric power conversion circuit for the input/output section. In addition, the power generation apparatus 2 output current amount and the power converter input current amount may be detected and the output pattern may be corrected based on these current amounts. Thus, for example, a deviation between the power generation apparatus 2 output current amount in one predetermined time period and the power converter 5 input current amount in the next predetermined time period may be calculated and the output pattern of the next predetermined time period corrected based on that current amount deviation. As a method of correcting a predetermined pattern, for example, the current amount to which it is desired that the current be corrected in the next predetermined time period may be calculated and multiplied by the output voltage (=power generation apparatus 2 output voltage=power converter 5 input voltage) of the power storage apparatus 6 to calculation the current amount, which is then added to the predetermined time period detected current amount and set as the amount of power generated in the next predetermined time period. The output pattern can then be corrected by setting the output pattern based on the corrected amount of power generated in the next predetermined time period.

Below, a description is given of specific embodiments of the present invention, based on the basic configuration of the power generation system according to the present invention as described above.

First Embodiment

Figure 4:
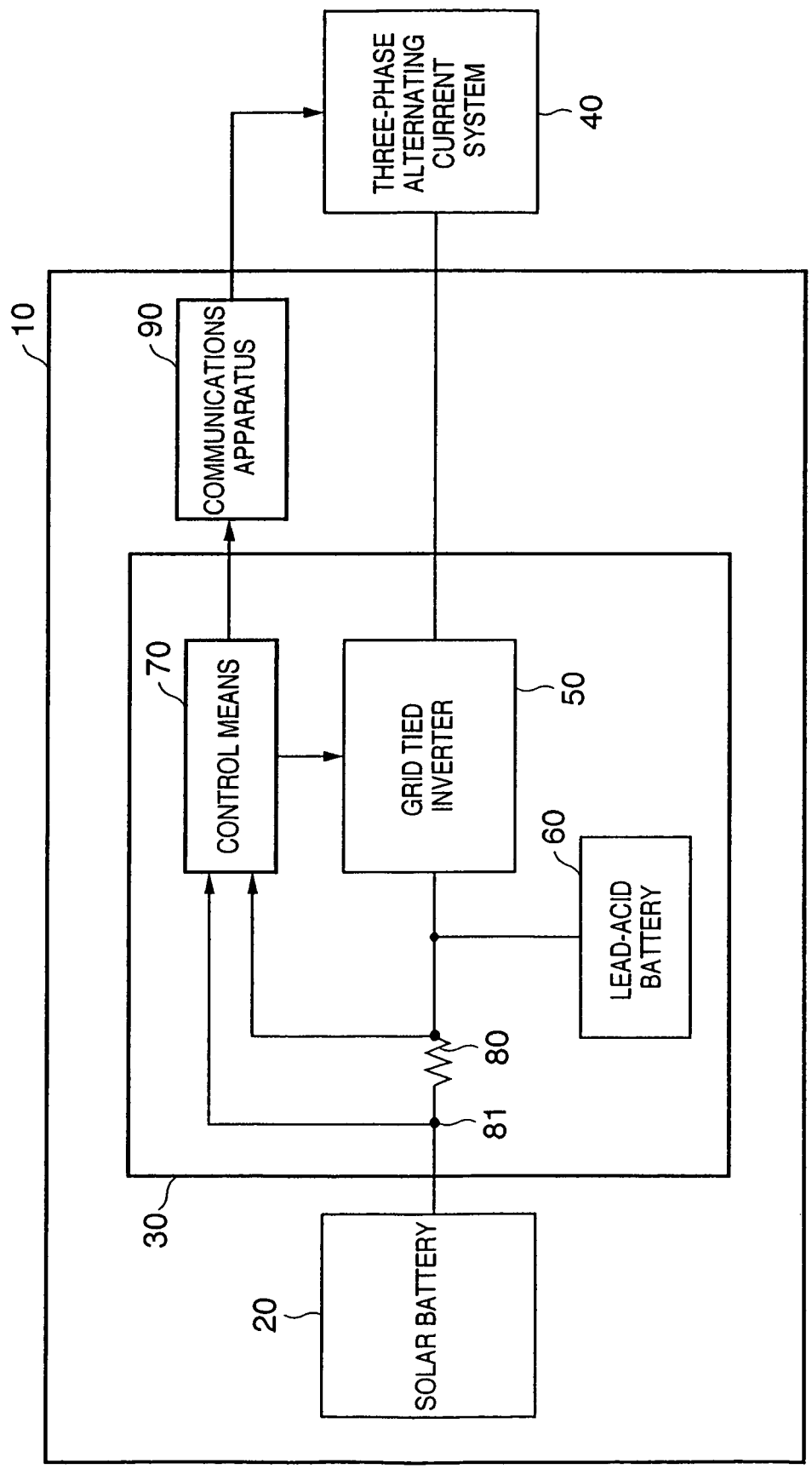
FIG. 4 is a block diagram showing the configuration of a first embodiment of the power generation system of the present invention.

FIG. 4 is a block diagram showing the configuration of a first embodiment of a power generation system according to the present invention. A power generation system 10 of the present embodiment adjusts and converts the output from a solar battery 20 into three-phase alternating current using an electric power control apparatus 30, which then outputs the converted power to a three-phase alternating current system 40.

The configuration of the power generation system 10 of the present embodiment is based on the basic configuration shown in FIG. 1 and FIG. 2, with the solar battery 20 corresponding to the power generation apparatus 2, the electric power control apparatus 30 corresponding to the electric power control apparatus 3, the grid tied inverter 50 corresponding to the power converter 5, the lead-acid battery 60 corresponding to the power storage apparatus 6, the control means 70 corresponding to the control means 7, the current detection means 80 and the voltage detection means 81 corresponding to the detection means 8 and the communication apparatus 90 corresponding to the notification means 9, respectively.

The output of the solar battery 20 is connected to the input section of the grid tied inverter 50 and to the input/output section of the lead-acid battery 60. The charge/discharge of the lead-acid battery 60 is controlled according to the power generation condition of the solar battery 20 and the output condition of the grid tied inverter 50. In other words, if the output of the solar battery 20 exceeds the grid tied inverter 50 input instruction electric power, then the lead-acid battery 60 is charged. By contrast, if the output of the solar battery 20 is less than the input instruction electric-power of the grid tied inverter 50, then the lead-acid battery 60 is discharged.

The grid tied inverter 50 converts the output from the lead-acid battery 60 into three-phase alternating current electric power of a desired size based on an instruction from the control means 70 to be described later. The current detection means 80 and the voltage detection means 81 detect the output current and the output voltage of the solar battery 20, respectively, and output the detected current value and the detected voltage value to the control means 70. The control means 70 calculates the output electric power of the solar battery 20 by multiplying the detected current value by the detected voltage value. Then, the control means 70 calculates the amount of power generated by the solar battery 20 by integrating the calculated electric power value over approximately 20 minutes (=predetermined time period). Based on the amount of power generated thus calculated, an output pattern for controlling the output of the grid tied inverter 50 is set in the following manner.

Figure 5A:
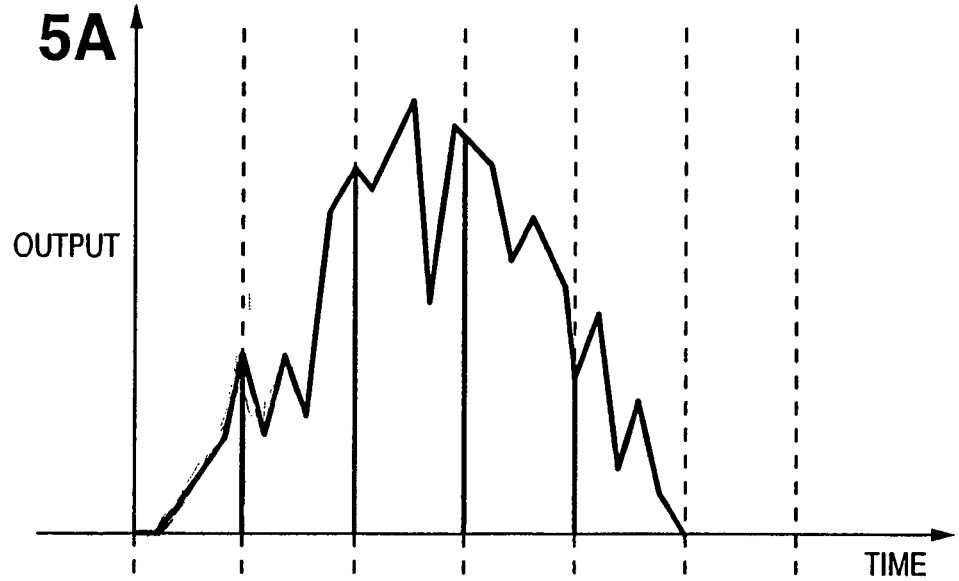
FIGS. 5A, 5B and 5C are diagrams illustrating predetermined output patterns of the first embodiment.
Figure 5B:
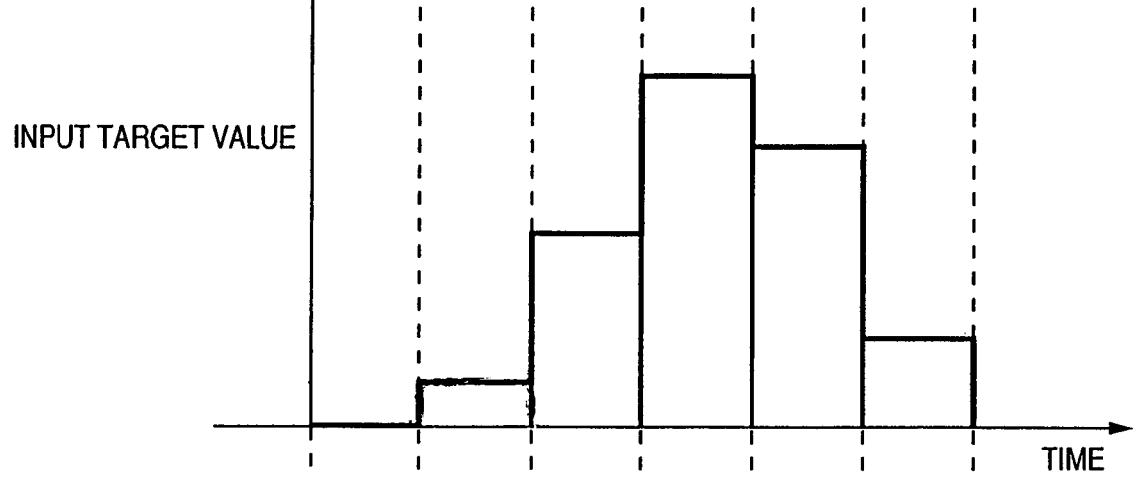
Figure 5C:

FIGS. 5A, 5B and 5C are schematic diagrams for the purpose of illustrating an output pattern of the present embodiment. In the diagrams, the horizontal axes represent time and the vertical axes represent, respectively, the output electric power of the solar battery 20 in FIG. 5A, the input target value of the grid tied inverter 50 in FIG. 5B, and the output pattern in FIG. 5C. In addition, the vertical dotted lines represent intervallic positions (times) within each predetermined time period.

The amount of power generated of the solar battery 20 in a predetermined time period is a value equivalent to the area obtained by integrating the output electric power over each predetermined time period as shown in FIG. 5A, and is calculated by the control means 70 as described above. Next, an average value for the output electric power for a predetermined time period is calculated from the calculated generated power amount for that predetermined time period, and that value is then set as the input power target value for the grid tied inverter 50 for the next predetermined time period. FIG. 5B shows input target values obtained in the foregoing manner. Here, the individual areas showing the amount of power generated for a predetermined time period of the solar battery 20 shown in FIG. 5A and the individual areas showing the calculated values of the next predetermined time period for the input target values for the grid tied inverter 50 are substantially identical, though offset by only one predetermined time period.

Next, the control means 70, using the power conversion efficiency of the grid tied inverter 50 stored in advance as data, calculates the output of the grid tied inverter 50 that corresponds to the grid tied inverter 50 input target value and uses this value as the output pattern for the electric power output from the grid tied inverter 50 in the next predetermined time period. The output patterns of each of the periods shown in FIG. 5C are substantially similar figures to the input target values for the grid tied inverter 50 shown in FIG. 5B, being smaller than the latter only by an amount of loss due to power conversion by the grid tied inverter 50. Based on the output pattern set by the control means 70 in the foregoing manner, the grid tied inverter 50 takes the output from the solar battery 20 and/or the lead-acid battery 60 as input, converts it, and outputs it to the three-phase alternating current system.

The communications apparatus 90, based on the intervallic timing of each predetermined time period set by the control means 70, transmits information on the scheduled output electric power of the power generation system 10 to the three-phase alternating current system 40.

It should be noted that, in FIGS. 5A, 5B and 5C, although the input target values shown in FIG. 5B and the output pattern shown n FIG. 5C are depicted as being set by the timing with which the predetermined time period shown in FIG. 5A ends, in actuality, as described above, it is necessary to notify the three-phase alternating current system 40 of the next predetermined time period output pattern through the communications apparatus 90 before the predetermined time period ends by the amount of time required for the communications+the starting of the power generating means, and therefore the intervallic positions (times) shown in FIG. 5A are offset slightly ahead of the intervallic positions shown in FIG. 5B and FIG. 5C.

Figure 10:
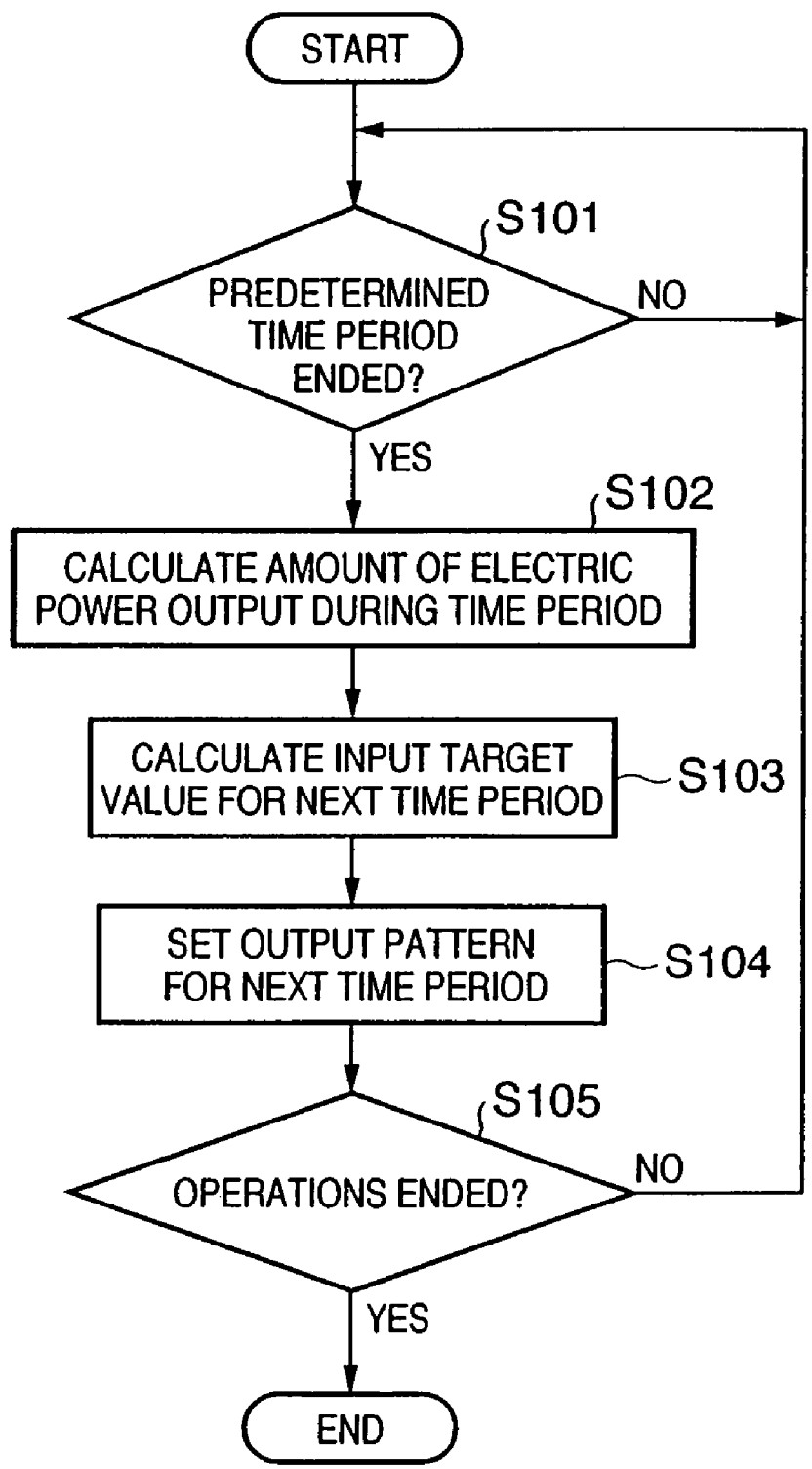
FIG. 10 is a flow chart illustrating a process performed by a control means of the first embodiment.

Here, a description is once again given of the process performed by the control means 70 of the present embodiment, with reference to the flow chart shown in FIG. 10.

First, a check is made to determine whether or not an initial predetermined time period has ended (step S101). If the predetermined time period has not ended, then the system waits on standby until the period ends. When the predetermined time period ends, the control means 70 calculates the amount of power generated by the solar battery in the predetermined time periods (the areas of each of the time periods shown in FIG. 5A) (step S102).

Next, the control means 70 calculates the average value for the output electric power of the predetermined time periods from the amount of power generated of the predetermined time period calculated and sets that value as the input power target value (FIG. 5B) for the grid tied inverter 50 in the next predetermined time period (step S103).

Then, using the pre-stored grid tied inverter 50 electric power conversion efficiency, calculates the grid tied inverter 50 output that corresponds to the input target value and sets this value as the output pattern (see FIG. 5C) for the electric power to be output from the grid tied inverter 50 in the next predetermined time period (step S104).

It is then determined Whether or not operation has ended (step S105), and each step starting from step S101 is repeated until such operation ends.

Thus, as described above, by using a configuration that, based on the output electric power of the solar battery within each time period sets the output pattern of the grid tied inverter of the next time period, it is possible to form in advance supply and demand plans for the power generators on the system side at each time period, and therefore the capacity of the lead-acid battery can be reduced. Furthermore, the operating conditions of the power generators of the three-phase alternating current system 40 can be stabilized, and therefore the impact of fluctuations in output on the system voltage and system frequency can be reduced and the three-phase alternating current system 40 stabilized.

In addition, a configuration is also possible in which, at an intermediate point in a given predetermined time period (for example, the midpoint), an average value for the amount of power generated up to that point is calculated, and that average value is used as a guaranteed minimum output value for the next predetermined time period at that point in time and transmitted to the three-phase alternating current system 40 from the communications apparatus 90. It should be noted that the output pattern confirmed when the predetermined time period ends thereafter should be transmitted. In this case, the system side power generator supply and demand plan can be formulated even further in advance, with the resulting advantage that the power grid system can be even further stabilized and the capacity of the lead-acid battery can be even further reduced. Furthermore, the impact of fluctuations in output on the system voltage and the system frequency can be further reduced and the three-phase alternating current system 40 better stabilized.

Similarly, a configuration is also possible in which, at an intermediate point in a given predetermined time period (for example, the midpoint), an average value for the amount of power generated up to that point is calculated, and that average value is used as an expected output value for the next predetermined time period at that point in time and transmitted to the three-phase alternating current system 40 from the communications apparatus 90. It should be noted that the output pattern confirmed when the predetermined time period ends thereafter should be transmitted. In this case as well, the system side power generator supply and demand plan can be formulated even further in advance, with the resulting advantage that the power grid system can be even further stabilized and the capacity of the lead-acid battery can be even further reduced. Furthermore, the impact of fluctuations in output on the system voltage and the system frequency can be further reduced and the three-phase alternating current system 40 better stabilized.

Second Embodiment

Next, a description is given of a power generation system according to a second embodiment of the present invention. In the following, a description of those portions that are the same as those described in the first embodiment described above is omitted and a description of only the distinctive features of the second embodiment is given.

The second embodiment, as with the first embodiment, adjusts the output from the solar battery 20 using an electric power control apparatus 30 and converts that output into three-phase alternating current electric power for output to a three-phase alternating current system 40. Where the second embodiment differs from the first embodiment is the method by which the output pattern is determined, a point that is described with reference to FIGS. 6A, 6B and 6C.

Figure 6A:
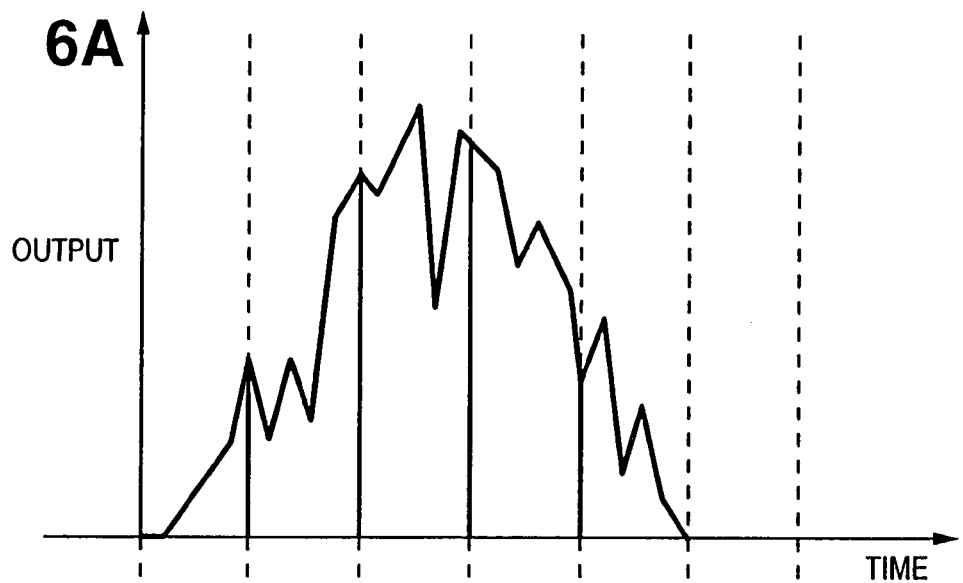
FIGS. 6A, 6B and 6C are diagrams illustrating predetermined output patterns of a second embodiment of the present invention.
Figure 6B:
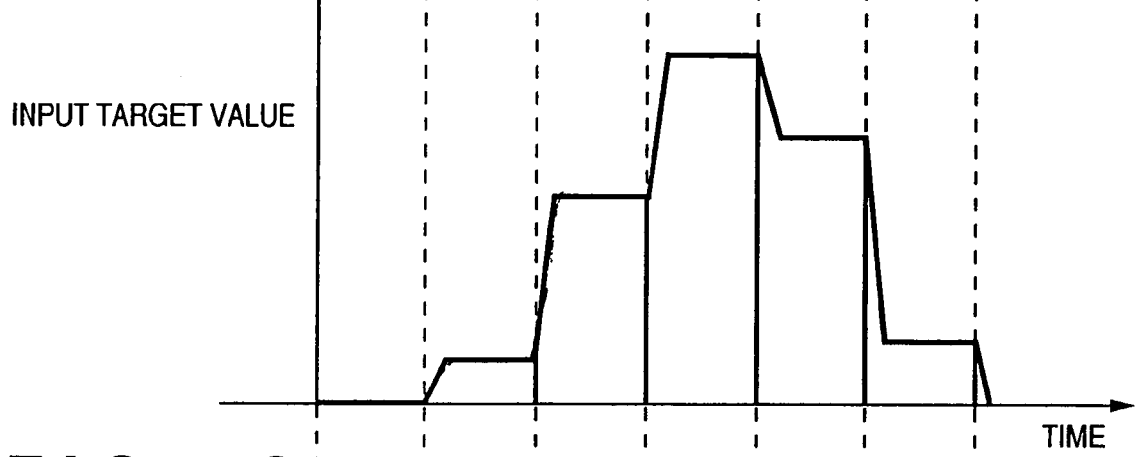
Figure 6C:
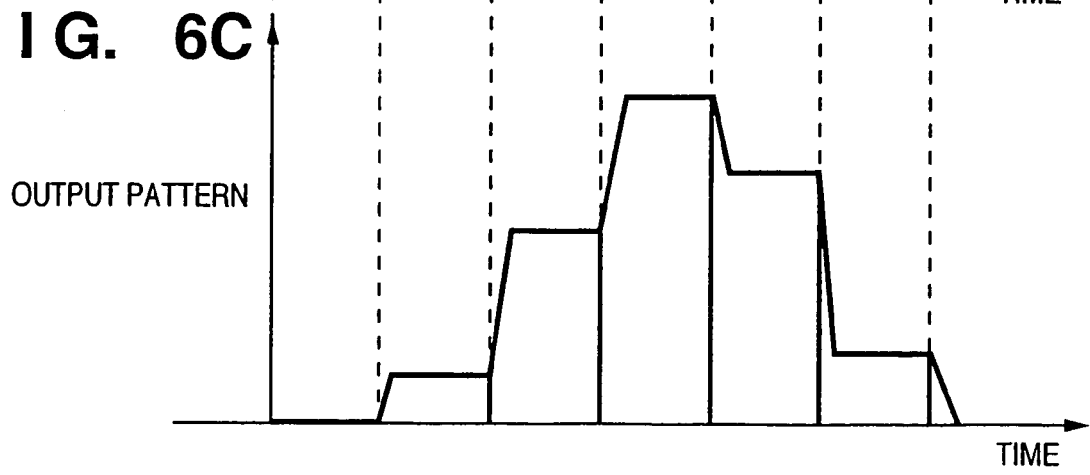

FIGS. 6A, 6B and 6C are schematic diagrams for the purpose of illustrating a predetermined output pattern of the present embodiment. As with FIGS. 5A, 5B and 5C, the horizontal axes represent time and the vertical axes represent, respectively, the output electric power of the solar battery 20 in FIG. 6A, the input target value of the grid tied inverter 50 in FIG. 6B, and the output pattern in FIG. 6C. In addition, the vertical dotted lines represent intervallic positions (times) within each predetermined time period. It should be noted that the output electric power is the same as that shown in FIG. 5A, with FIGS. 6B and 6C differing from FIGS. 5B and 5C, respectively. In other words, in the present embodiment, the control means 70 sets the input target value and the output pattern in the manner described below.

In the second embodiment as well, the input target value for the grid tied inverter 50 for the next predetermined time period is set based on the amount of power generated by the solar battery 20 of one predetermined time period. However, in the second embodiment, the input target value is varied linearly from the final value for the input target value for the predetermined time period in a fixed fluctuation period after the next predetermined time period (for example, ⅙ or less of the predetermined time period) as shown in FIG. 6B, and set as the input target value only after the fluctuation period has elapsed. It should be noted that, in the present embodiment as well, the final value for the input target value is set so that the area encompassed by the input target value within any given predetermined time period shown in FIG. 6B is equivalent to the amount of power generated (that is, the area) of the output electric power within the previous predetermined time period shown in FIG. 6A. This final value can be calculated easily because the duration of the fluctuation period, the duration of the predetermined time period, the final value of the input target value of the predetermined time period and the amount of power generated by the solar battery 20 within the predetermined time period are known.

The value that should be output from the grid tied inverter 50 is calculated from the input target value obtained in the manner described above and from the grid tied inverter 50 power conversion efficiency, and the output pattern shown in FIG. 6C is set. The grid tied inverter 50 then outputs electric power to the three-phase alternating current system 40 based on the output pattern shown in FIG. 6C.

The communications apparatus 90, based on the output pattern determined by the control means 70 at intervals of each of the predetermined time periods, then transmits information on the scheduled output electric power of the power generation system 10 to the three-phase alternating current system 40.

With the power generation system of the present embodiment, by controlling the output electric power based on the output pattern as described above, rapid fluctuations in output from the grid tied inverter 50 just after the changeover of a predetermined time period can be greatly reduced. As a result, rapid changes in the operating conditions of the power generators of the three-phase alternating current system can be restrained, and their impact on the system voltage and the system frequency can be reduced and the three-phase alternating current system 40 can be stabilized. Further, the system side supply and demand plan can be formulated well in advance.

It should be noted that, when the duration of the above-described fluctuation period is lengthened, the time period in which fixed electric power is output from the grid tied inverter 50 (power converter) is shortened. Here, if the amount of electric power output in the predetermined time period is the same as when the fluctuation period is short, then the difference between the final output value in one predetermined time period and the final output value in the next predetermined time period increases. In other words, the fixed values in the time periods shown in FIGS. 6B and 6C increase. Accordingly, by lengthening the fluctuation period, it not only becomes necessary to increase the output capacity of the grid tied inverter 50 the power converter) and the capacity of the lead-acid battery 60 (power storage apparatus) but the charge/discharge from the lead-acid battery increases and the power loss increases. As a result, it is preferable to shorten the duration of the fluctuation period in a range in which a degree of moderation of the effects of output fluctuation on the system is obtained. As a specific example, preferably, the duration of the fluctuation period is set at ¼ or less of the predetermined time period.

In addition, the output pattern may be adjusted so that, when the speed of the fluctuation in the output of the grid tied inverter 50 in the fluctuation period described above (that is, the slope of the fluctuation in the fluctuation period) is greater than a predetermined value, the speed of the output fluctuation is limited to a fixed value and the duration of the fluctuation period is temporarily lengthened. Such an arrangement has the advantage that the supply and demand plan can be formulated well in advance, the power grid system can be stabilized and the capacity of the lead-acid battery can be reduced. Furthermore, the impact of fluctuations in output on the system voltage and the system frequency can be reduced and the three-phase alternating current system 40 can be stabilized.

Moreover, in the present embodiment as well, a configuration is also possible in which, at an intermediate point in a given predetermined time period (for example, the midpoint), an average value for the amount of power generated up to that point is calculated, and that average value used as a guaranteed minimum output value for the next predetermined time period at that point in time and transmitted to the three-phase alternating current system 40 from the communications apparatus 90. It should be noted that the output pattern confirmed when the predetermined time period ends thereafter should be transmitted. In this case, the system side power generator supply and demand plan can be formulated even further in advance, with the resulting advantage that the power grid system can be even further stabilized and the capacity of the lead-acid battery can be even further reduced. Furthermore, the impact of fluctuations in output on the system voltage and the system frequency can be further reduced and the three-phase alternating current system 40 better stabilized.

Third Embodiment

Next, a description is given of a third embodiment of a power generation system according to the present invention. In the following, a description of those portions that are the same as in the first and second embodiments described above is omitted and a description of only the distinctive features of the third embodiment is given.

Figure 7:
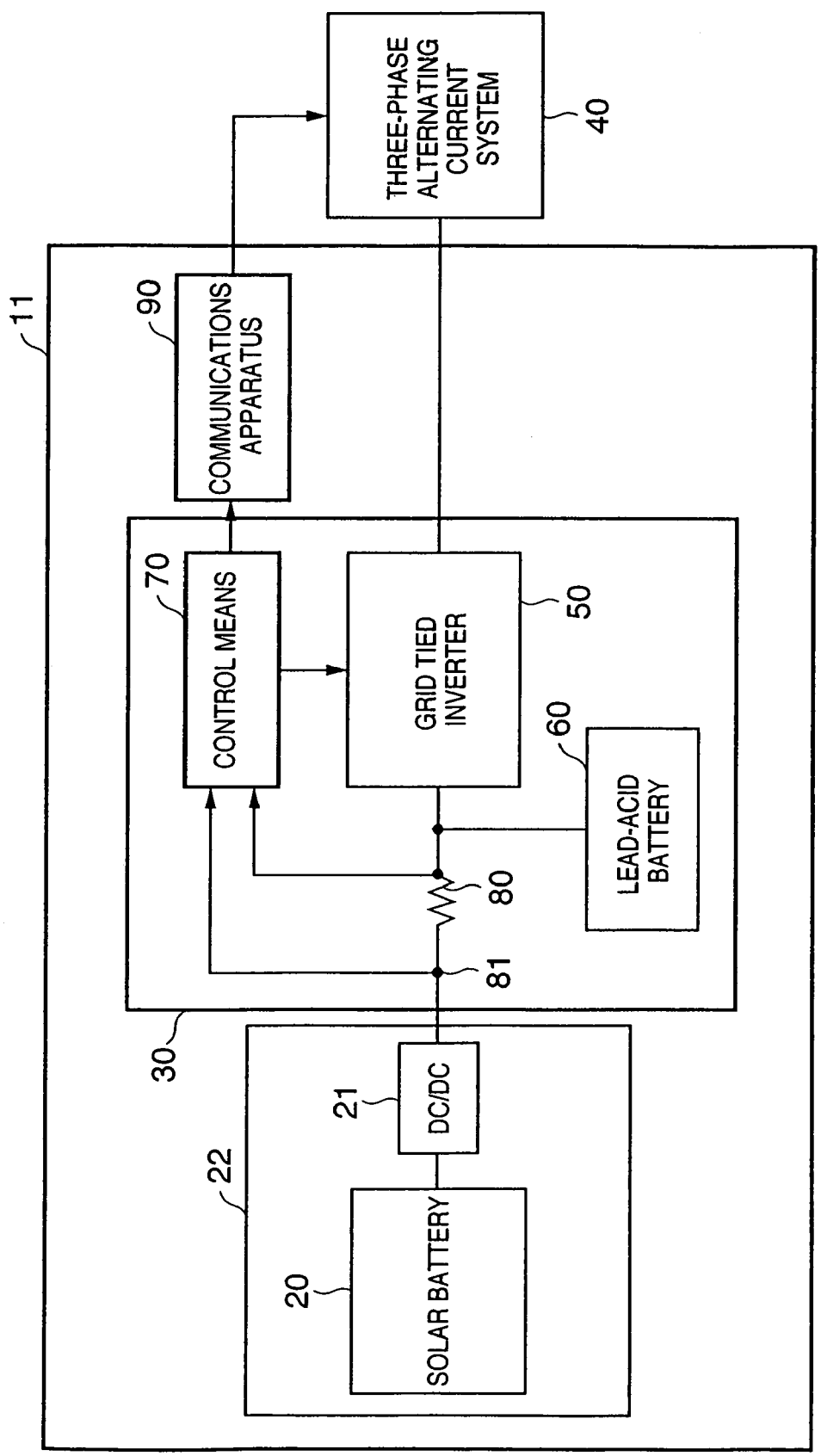
FIG. 7 is a block diagram showing the configuration of a third embodiment of the power generation system of the present invention.

FIG. 7 is a block diagram showing the configuration of a third embodiment of a power generation system according to the present invention. Whereas in the first and second embodiments only a solar battery 20 is used as the power generation apparatus, in the third embodiment, as shown in the diagram, a power generation apparatus 22 is comprised of the solar battery 20 and a DC/DC converter 21 that converts (steps up) the output voltage of the solar battery 20.

In the case of the configuration of the present embodiment, it is possible to select a solar battery 20 output voltage to be used that is unrelated to the operable input voltage of the grid tied inverter 50 or the voltage of the lead-acid battery 60, thus enhancing system design flexibility. In addition, the operating point of the solar battery 20 can be controlled at will with the DC/DC converter 21, thereby providing so-called maximum power point tracking control (MPPT control) that extracts the maximum output from the solar battery 20 and thus increasing efficiency as a power generation system, which is preferable.

In addition, by adopting a configuration in which the DC/DC converter 21 output voltage is adjusted whenever the lead-acid battery 60 is overcharged or the charging current is excessive, there is also the advantage of being able to protect the lead-acid battery from overcharging and excessive charging current.

Fourth Embodiment

Next, a description is given of a fourth embodiment of the power generation system according to the present invention. In the following, a description of those portions that are the same as in the first, second and third embodiments described above is omitted and a description of only the distinctive features of the fourth embodiment is given.

Figure 8:
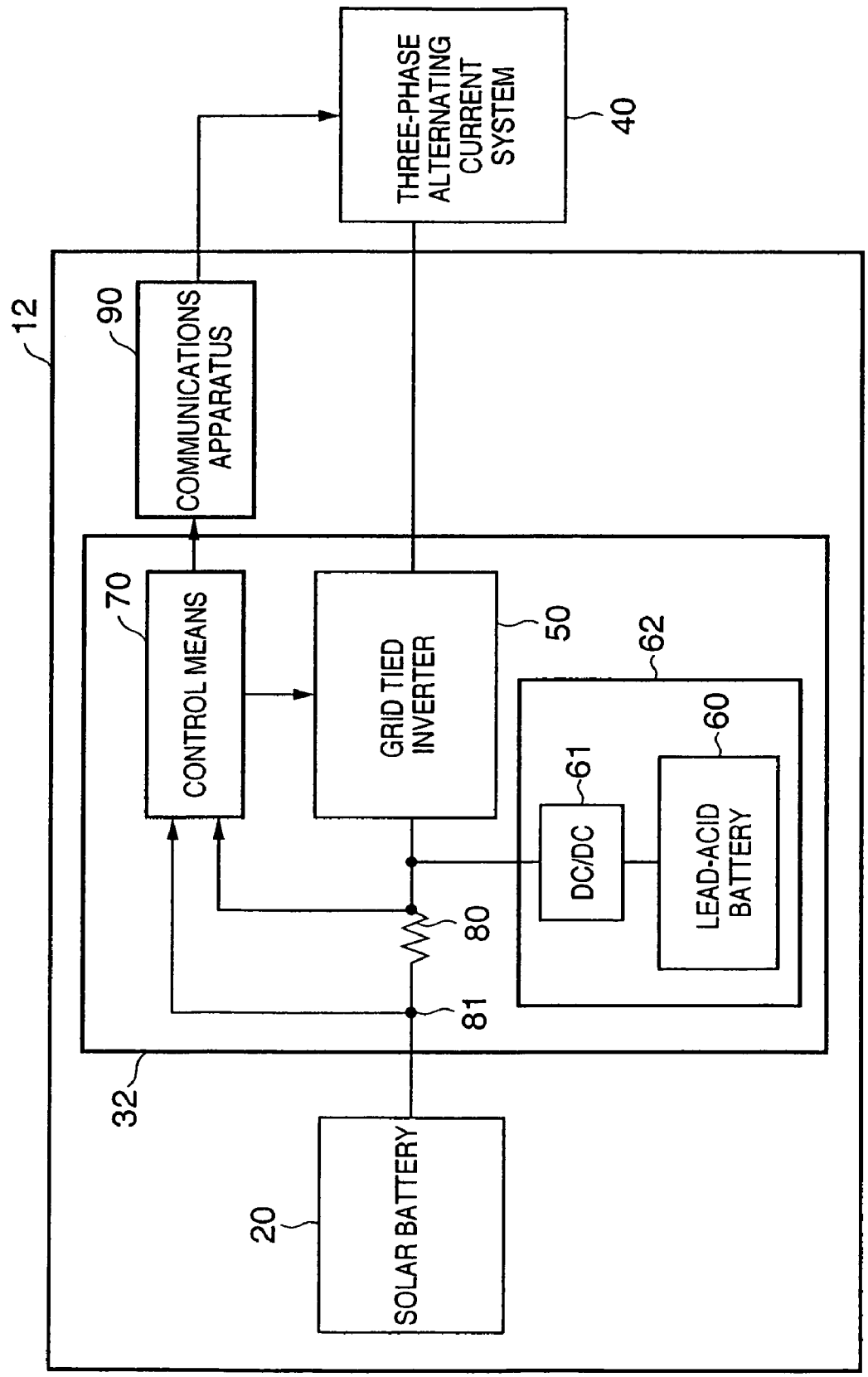
FIG. 8 is a block diagram showing the configuration of a third embodiment of the power generation system of the present invention.

FIG. 8 is a block diagram showing the configuration of a fourth embodiment of the power generation system according to the present invention. Whereas in the first, second and third embodiments the power storage apparatus of the electric power control apparatus 3 is comprised of only the lead-acid battery 60, in the fourth embodiment a power storage apparatus 62 of an electric power control apparatus 32 is comprised of the lead-acid battery 60 and a DC/DC converter 61 that converts (steps up/steps down) both the charge voltage and the discharge voltage of the lead-acid battery 60.

In such a configuration, the voltage of the lead-acid battery 60 can be selected without regard to the operable input voltage of the grid-tied inverter 50 and the voltage of the solar battery 20, thus enhancing system design flexibility. In addition, by connecting the lead-acid battery 60 through the DC/DC converter 61, the operating point of the solar battery 20 can be controlled at will. Thus, controlling the DC/DC converter 61 and/or the grid tied inverter 50, provides so-called maximum power point tracking control (MPPT control), which extracts the maximum output from the solar battery 20 and thereby increases efficiency as a power generation system, which is preferable.

In addition, by adopting a configuration in which the DC/DC converter 61 input is adjusted whenever the lead-acid battery 60 is overcharged or the charging current is excessive, there is also the advantage of being able to protect the lead-acid battery from overcharging and excessive charging current.

Other Embodiments

It should be noted that the present invention is not limited to the above-described embodiments, and various modifications can be made in keeping with the spirit of the invention.

In the embodiments described above, strictly speaking, the solar battery output electric power cannot actually be used as is from the power storage apparatus (the lead-acid battery, etc.). Accordingly, a current detection means that detects the power storage apparatus charge/discharge current, the power converter (grid tied inverter) input current and the like may be provided, and the predetermined output pattern described above may be adjusted based on the amount of current in a predetermined time period of the power storage apparatus, the total amount of current of the power storage apparatus, and the deviation between the amount of current in the predetermined time period of the input current from the power generation apparatus and the amount of current in the next predetermined time period of the input current of the power converter.

As a result, the power storage apparatus maximum charge amount can be reduced, and moreover, can be controlled so that the charge level at the start of a day and at the end of the day is equal.

In addition, although the foregoing system uses as an example of a power system one that includes one or more power generators, the present invention is also applicable to a power system that does not include a power generator, and in this case also, the output of the electric power control apparatus is stabilized and the capacity of the power storage apparatus can be reduced as well.

The present invention is applicable to a power generation system constituted by a plurality of devices or to electric power control apparatus of a power generation system comprising a single device.

In addition, although in the above-described embodiment the predetermined time period is a fixed value, the present invention is not limited to such an arrangement. Thus, the predetermined time period can be varied as convenient, provided that the supply and demand plan for the power generators on the system side can be formulated in advance, the power grid system stabilized and the lead-acid battery capacity reduced, and the impact on the system voltage and the system frequency minimized. In addition, the predetermined time period may be changed periodically or irregularly.

Furthermore, the invention can be implemented by supplying a software program, which implements the functions of the foregoing embodiments, directly or indirectly to a system or apparatus, reading the supplied program with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-123442 filed on Apr. 9, 2004, which is hereby incorporated by reference herein.

What is claimed is:

1. A power generation system comprising:
a power generation apparatus that generates electric power;
a power control apparatus that outputs the electric power generated by the power generation apparatus to a power system; and
a notification unit that provides the power system with information relating to estimation of an amount of electric power output from the power control apparatus,
wherein the power control apparatus comprises:
a power converter that converts the electric power;
a power storage that stores the electric power output from the power generation apparatus or output from the power converter as well as discharges the stored electric power as necessary;
a detection unit that detects an amount of the electric power generated by the power generation apparatus within a predetermined time period; and
a control unit that sets an output pattern of the power control apparatus in a next predetermined time period based on the amount of generated electric power of each predetermined time period to match an amount of electric power output from the power control apparatus within the next predetermined time period with the amount of the generated electric power of each predetermined time period, and controls the output of the power control apparatus in accordance with the output pattern,
wherein the control unit sets the output pattern by calculating an average value of the amount of the generated electric power of each predetermined time period, and sets the average value as an input target value for the power converter for the next predetermined time period, and
wherein the notification unit estimates the amount of electric power output from the power control apparatus in the next predetermined time period based on the output pattern to provide the information relating to the estimation.

2. The power generation system according to claim 1, wherein the power system includes a power generator which generates electric power.

3. The power generation system according to claim 1, wherein the power generation apparatus uses natural energy to generate the electric power.

4. A power system comprising:
a power generation system that generates electric power;
a receiver that receives information relating to estimation of an amount of electric power from the power generation system;
a setting unit that sets a supply and demand plan for a power generator based on the received information; and
a controller that controls operation of the power generator, which generates electric power, based on the supply and demand plan,
wherein the power generation system comprises:
a power generation apparatus that generates electric power;

a power control apparatus that outputs the electric power generated by the power generation apparatus to the power system; and a notification unit that provides the power system with the information relating to the estimation of an amount of electric power output from the power control apparatus, wherein the power control apparatus comprises:

a power converter that converts the electric power;

a power storage that stores the electric power output from the power generation apparatus or output from the power converter as well as discharges the stored electric power as necessary;

a detection unit that detects an amount of the electric power generated by the power generation apparatus within a predetermined time period; and a control unit that sets an output pattern of the power control apparatus in a next predetermined time period based on the amount of generated electric power of each predetermined time period to match an amount of electric power output from the power control apparatus within the next predetermined time period with the amount of the generated electric power of each predetermined time period, and controls the output of the power control apparatus in accordance with the output pattern, wherein the control unit sets the output pattern by calculating an average value of the amount of the generated electric power of each predetermined time period, and sets the average value as an input target value for the power converter for the next predetermined time period, and wherein the notification unit estimates the amount of electric power output from the power control apparatus in the next predetermined time period based on the output pattern to provide the information relating to the estimation.

* * * * *